(12) United States Patent
Fujimoto et al.

(10) Patent No.: US 10,610,897 B2
(45) Date of Patent: Apr. 7, 2020

(54) METHOD OF CONTROLLING THE OPERATION OF VIBRATION SCREEN

(71) Applicant: Kabushiki Kaisha Kinki, Hyogo (JP)

(72) Inventors: Shinya Fujimoto, Hyogo (JP); Masuyuki Mieda, Hyogo (JP); Junichi Asakura, Hyogo (JP); Mitsuhiro Aota, Hyogo (JP); Hiroaki Kajiyama, Hyogo (JP); Naoya Wada, Hyogo (JP)

(73) Assignee: KABUSHIKI KAISHA KINKI, Hyogo (JP)

( * ) Notice: Subject to any disclaimer, the term of this patent is extended or adjusted under 35 U.S.C. 154(b) by 0 days.

(21) Appl. No.: 15/779,640

(22) PCT Filed: Dec. 8, 2015

(86) PCT No.: PCT/JP2015/084418
§ 371 (c)(1),
(2) Date: May 29, 2018

(87) PCT Pub. No.: WO2017/098582
PCT Pub. Date: Jun. 15, 2017

(65) Prior Publication Data
US 2018/0345320 A1    Dec. 6, 2018

(51) Int. Cl.
*B07B 1/42* (2006.01)
*B65G 27/20* (2006.01)
*B06B 1/16* (2006.01)

(52) U.S. Cl.
CPC .................. *B07B 1/42* (2013.01); *B06B 1/16* (2013.01); *B06B 1/166* (2013.01); *B65G 27/20* (2013.01)

(58) Field of Classification Search
CPC .................................... B07B 1/42; B06B 1/16
USPC ......................................................... 209/326
See application file for complete search history.

(56) References Cited

U.S. PATENT DOCUMENTS

| 2,702,633 | A | * | 2/1955 | Dekanski | ................ | B07B 1/18 |
|  |  |  |  |  |  | 209/287 |
| 3,591,001 | A | * | 7/1971 | Quesnel | ................ | B07B 1/18 |
|  |  |  |  |  |  | 209/287 |
| 4,255,254 | A | * | 3/1981 | Faust | ................ | B06B 1/166 |
|  |  |  |  |  |  | 198/770 |

(Continued)

FOREIGN PATENT DOCUMENTS

| JP | 09078579 A | * | 3/1997 |  |  |
| JP | 4422352 B2 | * | 2/2010 | ............ | Y02T 10/32 |
| WO | WO-2014171416 A1 | * | 10/2014 | ............ | H02K 7/061 |

*Primary Examiner* — Terrell H Matthews
(74) *Attorney, Agent, or Firm* — Wenderoth, Lind & Ponack, L.L.P.

(57) ABSTRACT

In an operation control method capable of securely reducing required motor capacity and power consumption, a threshold based on load size is preset, and after a driven or rotated state of each of two rotating shafts becomes steady, and if the load size is smaller than the threshold, conveyance of a rotating drive to one of the two rotating shafts is stopped and the one of the two rotating shafts with the conveyance of the rotating drive stopped is interlocked and rotated together with the other of the two rotating shafts by vibration generated by a rotating drive of the other of the two rotating shafts, and if the load size becomes larger than the threshold, the conveyance of the rotating drive to the one of the two rotating shafts with the conveyance of the rotating drive stopped is started so as to drive or rotate the two rotating shafts.

7 Claims, 6 Drawing Sheets

(56) References Cited

U.S. PATENT DOCUMENTS 10,263,493 B2 * 4/2019 Fujimoto ................. B07B 1/42

* cited by examiner

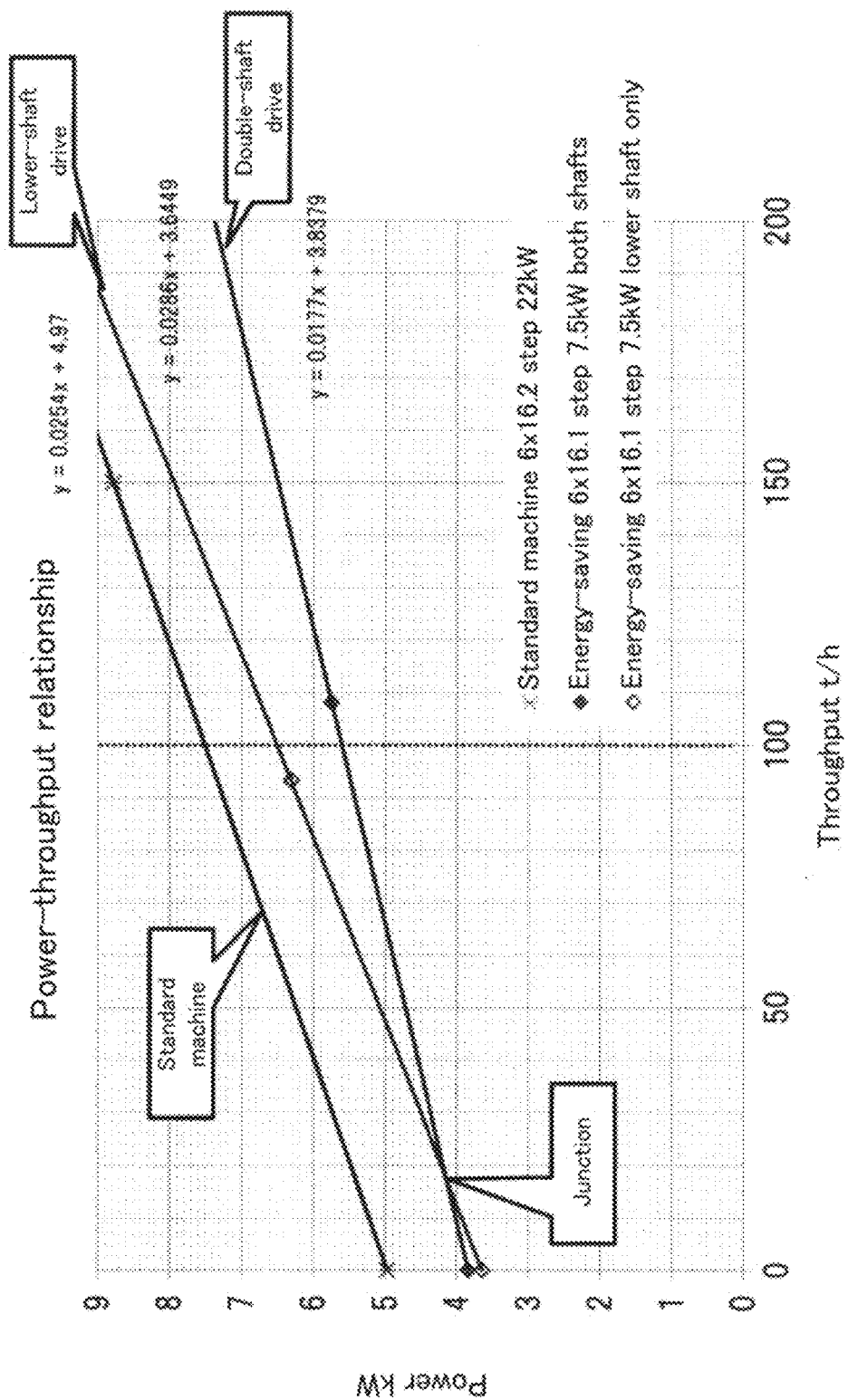

METHOD OF CONTROLLING THE OPERATION OF VIBRATION SCREEN

TECHNICAL FIELD

This invention concerns a method of controlling the operation of a vibration screen, especially equipped with a vibration generator provided with motors arranged in such a way that two rotating shafts equipped with eccentric weights arranged in parallel can be driven independently.

BACKGROUND ART

Conventionally, the vibration screen has been provided with such a vibration generator as to generate vibration by rotating in mutually reverse directions the two rotating shafts equipped with eccentric weights arranged in parallel (e.g. refer to patent literature 1).

With the vibration generator of this type, the two rotating shafts are rotated mutually in reverse directions by linking them using gears as a means to rotate them and conveying the rotary drive force of one motor to each of the rotating shafts, thus rotating them mutually reverse directions in a synchronized way.

On the other hand, there exists another type not requiring the gears (this is called "gearless mechanism" in this specification) by arranging two motors so as to drive and rotate the two rotating shafts independently. In case of the vibration generator using this gearless mechanism, it is advantageous in reducing power consumption because there is no energy loss due to the gears and in checking noise during operation, but the following disadvantages exist.

(1) In case of two motors (total capacity kW), the starting torque theoretically requires about 20% larger in comparison with the starting torque (capacity of a motor) required to drive the vibration generator using gears. Since this type of machine does not normally exceed the rated current during load operation, it is normally selected with the starting torque.

(2) For this reason, the load rate against the capacity of motor becomes lower than the vibration generator using gears, and it leads to an increase in power consumption from the viewpoint of characteristics of the motor (efficiency is low in the use state with a low load rate).

(3) Since two motors are installed, it is difficult to arrange the motors on one side, and therefore, they are arranged on both sides of the vibration screen. In this case, space for arranging the motors becomes large, and therefore, the motors and vibration generator are integrated and installed to save the space, and they are generally vibrated together with the vibration screen, but for this reason, however, the weight of the vibration generator increases, finally leading to an increase in power consumption.

By the way, this applicant, considering the problems of the vibration screen using the vibration generator applying the above conventional gearless mechanism, proposed a vibration generator capable of reducing the motor capacity and peak power consumption required (see Patent Literature 2).

PRIOR ART LITERATURE

Patent Literature

Patent literature 1 実開平 6-3 9 1 3 4 official gazette
Patent literature 2 international publication No. 2014/171416

OUTLINE OF INVENTION

Problems to be Solved by the Invention

With the vibration generator described in the patent literature 2, (a) such a mechanism to control the rotating drive was made that one of two rotating shafts was started when starting, and after the rotating shaft became steady in the driven state of the rotating shaft, the other rotating shaft was started, thus making it possible to reduce the peak capacity of the motor required to drive the two rotating shafts, thereby making it possible to reduce the peak value of the power consumption of the motor, (b) such a mechanism to control the rotating drive was made that after the driven state of the two rotating shafts became steady, the conveying of the rotating drive to one of the two rotating shafts was stopped and the rotating shaft with the conveyance of the rotating drive stopped was rotated interlocked with the other rotating shaft by the vibration generated due to the rotating drive of the other rotating shaft thereby making it possible to reduce the power consumption of the motor, and a certain initial objective was thus achieved.

As a result of the research and development of the applicant, however, it was found that the power consumption of the motor increased in some cases depending on the operation conditions, not only the effect of reducing the power consumption of the motor was not obtained.

In consideration of the problems of the vibration screen using the vibration generator applying the above conventional gearless mechanism, the objective of this invention is to provide a method of controlling the operation of the vibration screen, which can securely reduce the required motor capacity and power consumption.

Means to Solve the Problems

In order to achieve the above objective, the operation control method of vibration screen of this invention is characterized in that two rotating shafts equipped with eccentric weights are arranged in parallel and in the method of controlling the operation of the vibration screen provided with the vibration generator with motors arranged in such a way that the two rotating shafts can be driven and rotated independently, a threshold based on the size of load is preset, and after the driven state of the aforementioned two rotating shafts becomes steady, the conveyance of the rotating drive to one of the two rotating shafts is stopped when the load size is smaller than the threshold and the rotating shaft with the conveyance of the rotating drive stopped is rotated together interlocked with the other rotating shaft by the vibration generated by the rotating drive of the other rotating shaft, and when the load size becomes larger than the threshold, the conveyance of rotating drive to the rotating shaft with the conveyance of the rotating drive stopped is started, thereby driving/rotating the two rotating shafts.

Here "when the driven/rotated state of the two rotating shafts becomes steady" means that the power consumption of motors rapidly rises when the rotating shafts are started, then it gradually decreases and converges on almost a certain value when the number of revolutions becomes the set number of revolutions.

It is also possible that one of the two rotating shafts is started when starting, and after the driven state of the rotating shaft becomes steady, the other rotating shaft is started so that the driven state of the rotating shaft becomes steady.

When the rotating shaft is started, it is possible to temporarily stop for a short time the conveyance of the rotating drive, thereby starting the rotating shaft through the pendulum action of the rotating shaft equipped with the eccentric weight.

Effect of Invention

According to the method of controlling the operation of the vibration screen of this invention, in the method of controlling the operation of the vibration screen provided with a vibration generator provided with two rotating shafts equipped with eccentric weights arranged in parallel and with motors arranged so that the two rotating shafts can be driven/rotated independently, a threshold based on the load size is preset, and when the load size is smaller than the threshold after the driven/rotated state of the two rotating shafts becomes steady, the conveyance of rotating drive to one of the two rotating shafts is stopped, and the rotating shaft with the conveyance of the rotating drive stopped is rotated together interlocked with the other rotating shaft, and when the load size becomes larger than the threshold, the conveyance of the rotating drive to the rotating shaft with the conveyance of rotating drive stopped is started, thereby making it possible to prevent the motor power consumption from increasing depending on the operation conditions while reducing the required motor capacity.

When starting, one of the two rotating shafts is started, and after the driven/rotated state of the rotating shaft becomes steady, the other rotating shaft is started, thereby making it possible to reduce the peak capacity of the motors required to drive/rotate the two rotating shafts, thereby making it possible to reduce the peak value of the consumption power of the motors.

When the rotating shaft is started, the conveyance of the rotating drive is stopped temporarily for a short time, and the rotating shaft is started through the pendulum action of the rotating shaft equipped with eccentric weight, thereby making it possible to secure the starting of the rotating shaft even when a motor with the capacity reduced is used.

BRIEF EXPLANATION OF DRAWINGS

FIG. 6: graph to show the relationship of throughput and power with the vibration screen.

FORM TO IMPLEMENT THE INVENTION

The method of controlling the operation of the vibration screen of this invention is explained below exemplifying the vibration screen provided with the vibration generator to implement the relevant method.

Figure 1:
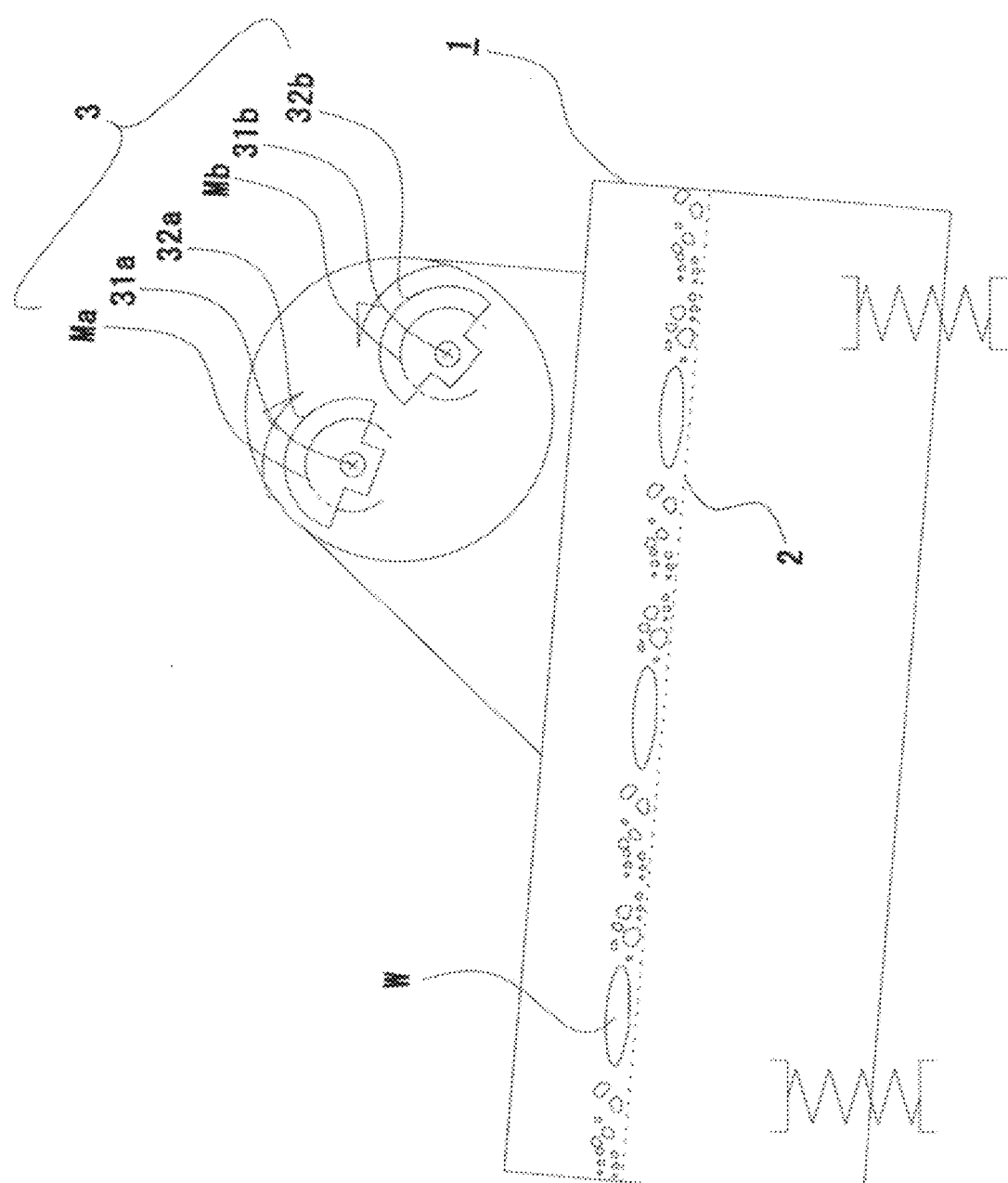
FIG. 1: front view to show an example of the vibration screen provided with the vibration generator to implement the method of controlling the operation of the vibration screen of this invention.

FIG. 1 shows an example of the vibration screen provided with the vibration generator to implement the method of controlling the operation of the vibration screen of this invention.

This vibration screen 1 is to transport work by vibrating and screening the work W through the bolting cloth 2 supplied on to the bolting cloth 2, and it is equipped with vibration screen 3 provided with two rotating shafts 31*a* and 31*b* arranged in parallel equipped with eccentric weights 32*a* and 32*b* to give vibration to the bolting cloth 2.

This vibration generator 3 is provided with motors Ma and Mb so as to drive the two rotating shafts 31*a* and 31*b* independently.

This vibration generator 3 starts one of the two rotating shafts 31*a* and 31*b* when starting, and after the driven/rotated state of this rotating shaft becomes steady, the other rotating shaft is started so as to change the driven/rotated state of this rotating shaft to a steady state so that the mechanism to control the rotating/driving is formed (illustration omitted). This makes it possible to reduce the peak capacity of the motors Ma and Mb required to drive/rotate the two rotating shafts 31*a* and 31*b*, thereby making it possible to reduce the power consumption of the motors Ma and Mb.

The effect of this action is specifically explained here. When two motors Ma and Mb were started at once, a large starting current (about 7-8 times the rated current per unit) ran causing a large voltage drop in the electric wiring from the transforming equipment to the motors Ma and Mb. Since this voltage drop decreases the starting torque of the motors Ma and Mb, it is one of the causes to cause starting failure. By sequentially starting the two motors, one by one, through the above operation control, the current to run at once is decreased, thereby making it possible to check the voltage drop and make the starting easier even under difficult conditions, and even if motors Ma and Mb with reduced capacity are used, the starting of the rotating shafts 31*a* and 31*b* can be securely done and the power consumption can finally be reduced.

Here "when the driven state of the rotating shaft becomes steady" means that the power consumption of the motors radically rises when one rotating shaft starts, then it gradually decreases, and when the number of revolutions becomes the set number of revolutions, it converges almost on a certain value.

Figure 2:
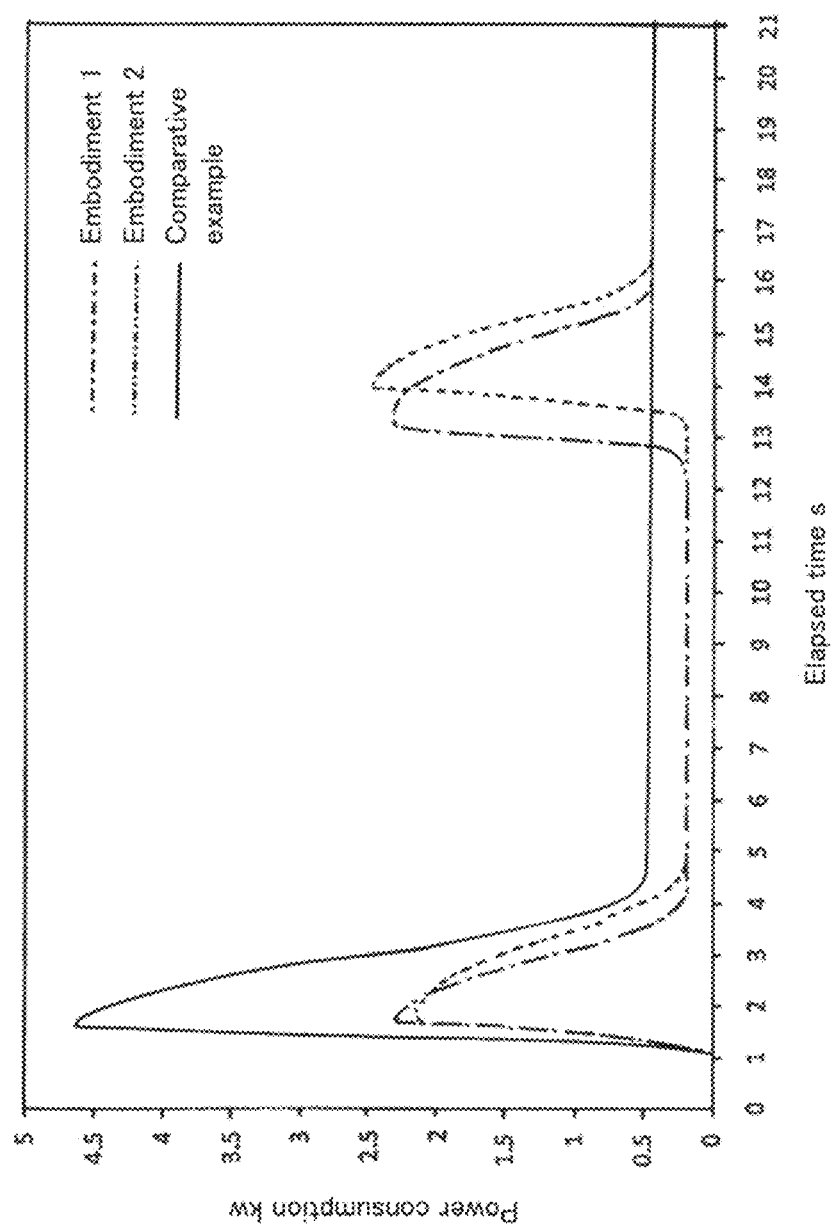
FIG. 2: Graph to show a concrete embodiment when starting and an experimentation of comparative example.

This is explained in accordance with more specific embodiments where the two rotating shafts 31*a* and 31*b* are independently driven in the reverse direction by using an induction motor for each of the motors Ma and Mb. FIG. 2 shows the power consumption when one shaft 31*a* (embodiment 1) or 31*b* (embodiment 2) of the two rotating shafts 31*a* and 31*b* is started first and the other rotating shaft 31*b* (embodiment 1) or rotating shaft 31*a* (embodiment 2) is started after the driven state of this rotating shaft becomes steady, and when the two rotating shafts 31*a* and 31*b* are started simultaneously first (comparative example).

In FIG. 2, the other rotating shaft 31*b* (embodiment 1) or rotating shaft 31*a* (embodiment 2) is started 12 seconds after the one rotating shaft 31a (embodiment 1) or rotating shaft 31b (embodiment 2) is started.

As clear from FIG. 2, it has been found that the embodiments 1 and 2 can reduce the peak capacity (power consumption) of the motors required to drive the two rotating shafts 31a and 31b in comparison with the comparative example (the peak capacity of the motors of embodiments 1 and 2 is about 55% of the comparative example) and can reduce the peak value of the power consumption of the motors.

Since the peak value of the power consumption of the motors can thus be reduced, it is possible to prevent occurrence of the big voltage drop in the electrical wiring from the transforming equipment to the motors Ma and Mb and possible to prevent the starting failure of the motors Ma and Mb.

Here even if the two motors Ma and Mb are started without synchronizing, the rotating shafts 31a and 31b can be naturally synchronized to the prescribed relative phase due to the vibration generated.

For this reason, the rotating drive control mechanism can start the two motors Ma and Mb providing a proper time gap (12 seconds in this embodiment) using a simple relay circuit or timer circuit.

Figure 3:
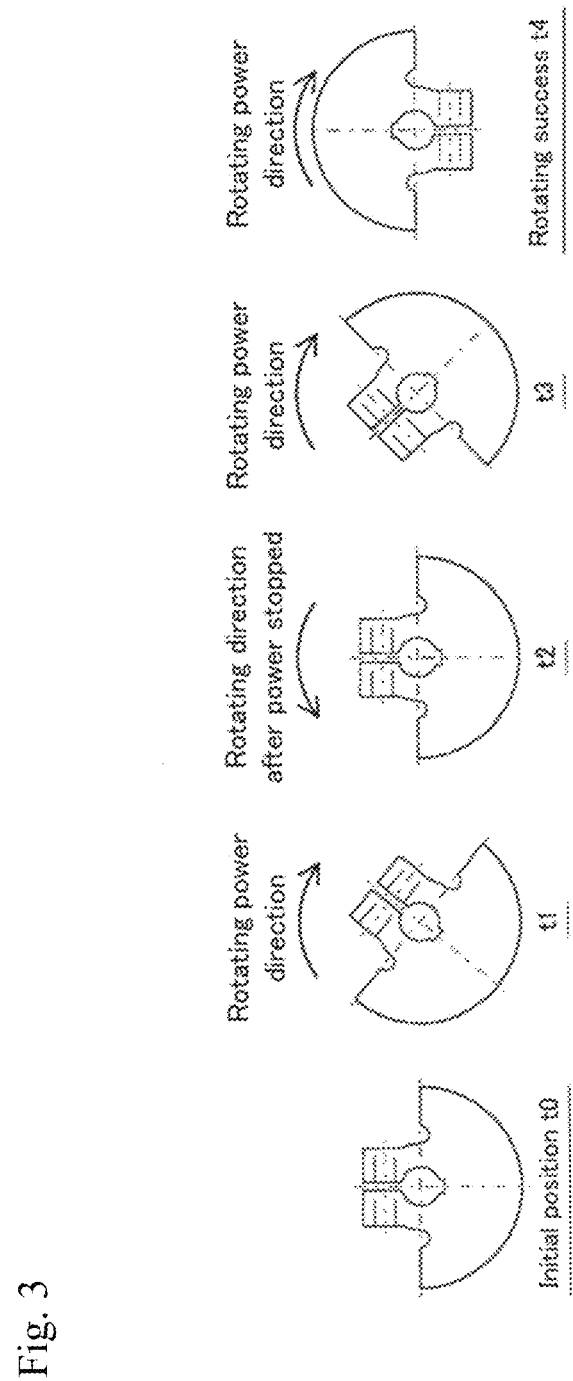
FIG. 3: Explanatory drawing to show the method of starting the rotating shaft through pendulum action of the rotating shaft.

By temporarily stop for a short time the conveyance of the rotating drive to the rotating shafts 31a and 31b, as shown in FIG. 3, when the rotating shafts 31a and 31b are started, it is possible to start the rotating shafts 31a and 31b through the pendulum action of the rotating shafts 31a and 31b equipped with eccentric weights 32a and 32b.

This makes it possible to secure the starting of the rotating shafts 31a and 31b even when motors Ma and Mb with reduced capacity are used.

The effect of this action is explained in a more concrete way. As shown in FIG. 3, the initial position of the eccentric weights 32a and 32b is t0 because they are eccentric. By starting the motors Ma and Mb, the eccentric weights 32a and 32b are raised to the state of t1 but stopped there because of the shortage of torque. If the conveyance of rotating drive is stopped by turning off the power supply, the potential energy accumulated at t1 is converted into the kinetic energy and the eccentric weights 32a and 32b are raised to the position of t3 via the state of t2. If the power supply is turned on again when the eccentric weights 32a and 32b reach about the top dead center or after the t3, thereby conveying the rotating drive, they can be raised higher than the state of t1 utilizing the potential energy accumulated at t3. Through this operation (or by repeating this operation as required), the eccentric weights 32a and 32b are completely raised as shown in t4, thereby making it possible to start the rotating shafts 31a and 31b.

This can solve the starting failure caused by such causes as voltage drop which occurs sometimes (though rarely) with the actual equipment used and oil hardening (increase in viscosity) due to decrease of air temperature in winter.

This vibration generator 3 is provided with motors Ma and Mb so as to drive two rotating shafts 31a and 31b, and after the rotating state of the two rotating shafts 31a and 31b becomes steady, the conveyance of rotating drive to one of the two rotating shafts 31a and 31b is stopped, and such a mechanism to control the rotating drive (illustration omitted) can be formed that the rotating shaft with the rotating drive stopped is rotated together interlocked with the other rotating shaft due to the vibration generated by the rotating drive of the other rotating shaft.

Here "when the rotated state of the two rotating shafts becomes steady" means that when the rotating shafts start, the power consumption of the motors rapidly rises, gradually decreases, and when the number of revolutions reaches the set number of revolutions, it converges almost on a certain value.

Figure 4:
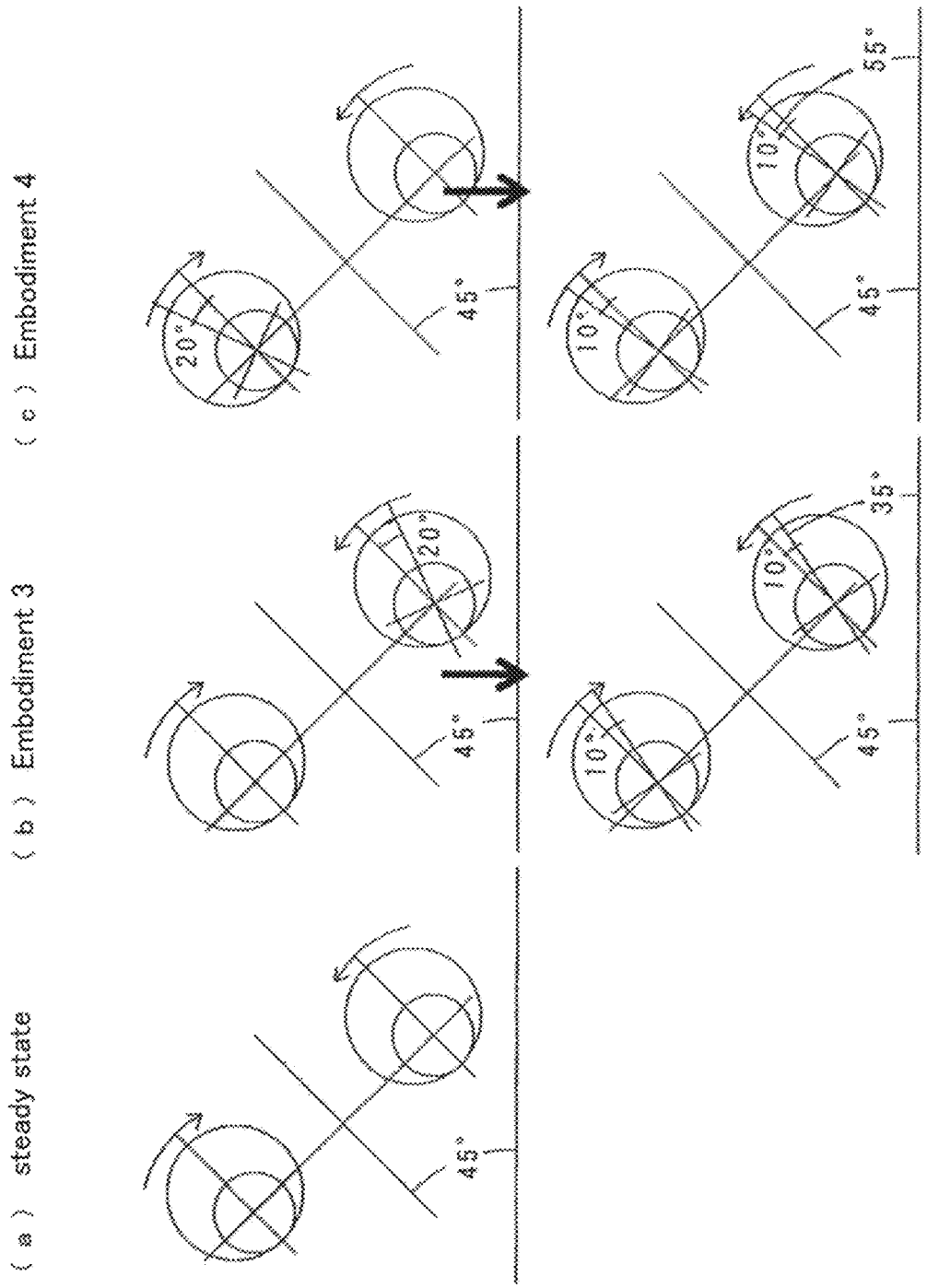
FIG. 4: Explanatory drawing to show a concrete embodiment to stop the rotating drive to one rotating shaft so as to be rotated together.

This is explained in accordance with more concrete embodiments where the two rotating shafts 31a and 31b are driven independently in reverse directions using an induction motor for each of the motors Ma and Mb. FIG. 4 shows such a case that after the rotated state of the two rotating shafts 31a and 31b becomes steady (double-shaft operation), the conveyance of the rotating drive to one rotating shaft 31b (embodiment 3) or rotating shaft 31b (embodiment 4) of the two rotating shafts 31a and 31b is stopped (specifically one motor Mb (embodiment 3) or motor Mb (embodiment 4) of the two motors Ma and Mb is stopped), and the rotating shaft 31a with the conveyance of rotating drive stopped is rotated together interlocked with the other rotating shaft 31a or 31b (single-shaft operation) due to the vibration generated by the rotating drive of the other rotating shaft 31a or 31b by the other motor Ma or Mb.

As shown in FIG. 4, the angle of the vibration direction (45° to the horizontal plane) when the rotated state of two rotating shafts 31a and 31b is steady, and in comparison with this, it approaches the horizontal direction (35 to the horizontal plane) in case of embodiment 3 because the rotating shaft 31b with the conveyance of rotating drive stopped is rotated together following (delayed from) the rotating shaft 31a rotated, and in case of embodiment 4, it approaches the vertical direction (55 to the horizontal plane) because the rotating shaft 31a with the conveyance of rotating drive stopped is rotated together following the rotating shaft 31b rotated.

Figure 5B:
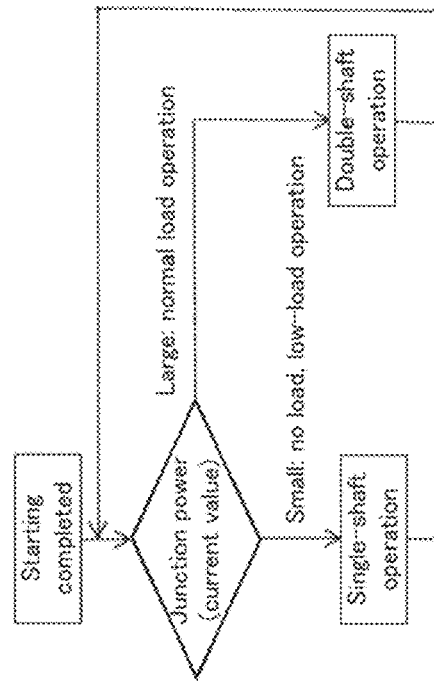
FIG. 5(*a*) is a graph to show the throughput and power relationship, and FIG. 5(*b*) is a flow diagram to show the method of controlling the operation.
Figure 5A:
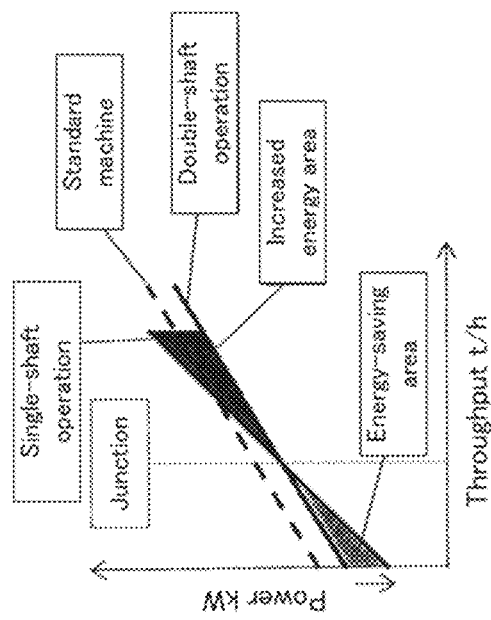

By the way, this single-shaft operation has one objective of reducing the power consumption of the motors Ma and Mb (the single-shaft operation when there is no load can save energy maximum 6% in comparison with the double-shaft operation when there is no load) but it was found, as shown FIG. 5(a) and FIG. 6, that the effect of reducing the power consumption of the motors Ma and Mb cannot be obtained depending on the load size (throughput) and rather the power consumption of the motors Ma and Mb increase.

That is, as shown in FIG. 5(a) and FIG. 6, the vibration generator using the gearless mechanism, in comparison with the vibration screen (standard machine) using the gear mechanism, can always reduce the power consumption, but in the single-shaft operation, the power consumption becomes larger than the double-shaft operation when the load size (throughput) increases exceeding a certain value, and the power consumption becomes larger than that of the standard machine if the load size (throughput) further increases.

For this reason, in consideration of the above knowledge, as shown in FIG. 5(b), a threshold based on the load size (throughput) (the threshold based on junction power (current value) in this embodiment) is preset and if load size is smaller than the threshold after the driven/rotated state of the two rotating shafts 31a and 31b becomes steady, the conveyance of rotating drive to one of the two rotating shafts is stopped and the rotating shaft with the conveyance of rotating drive stopped is rotated together interlocked with the other rotating shaft by the vibration generated by the rotating drive of the other rotating shaft (single-shaft operation), and if the load size becomes larger than the threshold, the rotating shaft with the conveyance of rotating drive stopped is started so as to drive/rotate the two rotating shafts 31a and 31b (double-shaft operation). Here the control of operations (single-shaft operation and double-shaft operation) of the motors Ma and Mb is such that the load size (throughput) (junction power (current value) in this embodiment) is taken into the control unit, and if the power consumption (current value) of the motors Ma and Mb is lower than the threshold, the single-shaft operation is done, and if it exceeds the threshold, the double-shaft operation is done. This can prevents the power consumption of the motors Ma and Mb from increasing, depending on the operation condition, while reducing the required capacity of the motors Ma and Mb.

By the way, the operation methods of embodiment 3 and embodiment 4 make it possible to select the screening operation of the vibration screen 1 depending on the difference of angle of vibration direction, thereby leading to an improved efficiency of screening.

That is, in the operation method of embodiment 3, the screening operation of (carrying force>screening force) occurs because the angle of vibration direction approaches the horizontal direction (35° to horizontal plane) in comparison with the steady state (45 to horizontal plane), and in the operation method of embodiment 4, on the other hand, the screening operation of (screening force>carrying force) occurs because the angle of vibration direction approaches the vertical direction (55 to horizontal plane) in comparison with the steady state (45 to horizontal plane). Utilizing the difference in screening operation depending on the angle of vibration direction, it is possible, for example, to conduct the screening operation of carrying-priority operation of (carrying force>screening force) after the driven/rotated state of the two rotating shafts 31*a* and 31*b* becomes steady, by the operation method of embodiment 3, and by periodically switching to the operation method of embodiment 4, as required, while carrying the work W supplied onto the bolting cloth 2 of the vibration screen 1 (in this case, it is also possible to have intervene the operation method to drive the two rotating shafts 31*a* and 31*b*), and through the screening operation of screening-priority of (screening force>carrying force), it is possible to conduct the screening by giving a big vibration to the work W via the bolting cloth 2.

The operation method of embodiment 4 is also equipped with a function to maintain the screening function of the bolting cloth 2 by removing through vibration the work W piercing and blocking the mesh of the bolting cloth because the angle of the vibration direction approaches the vertical direction (55° to horizontal plane).

With the two motors Ma and Mb, either one of them can be stopped, and therefore, the mechanism to control the driving/rotating can control the driving of the two motors Ma and Mb using a simple relay circuit or timer circuit.

One of the two motors can be stopped continuously or intermittently. As shown in FIG. 4, the two motors Ma and Mb can be simultaneously started to make steady the rotated/driven state of the two rotating shafts but it is desirable to start one of the rotating shafts 31*a* and 31*b* first and then start the other rotating shaft after the rotated state of this rotating shaft becomes steady, as described above.

By the way, the angle of vibration direction can be set to an optional angle, for example, 55°±22.5 to the horizontal plane, by adjusting the angle (45° in this embodiment) formed by the mediator of the line connecting the center of the two rotating shafts 31*a* and 31*b* and the horizontal plane.

The period of vibration generated can be set to an optional period by means of the number of revolutions of the two rotating shafts (specifically the number of revolutions of the two motors Ma and Mb).

The operation control methods of the vibration screen of this invention have been explained above, but this invention is not limited to the configurations described in the above embodiments, and the configurations can be changed as required so long as they are in line with the objective.

POSSIBILITY OF INDUSTRIAL USE

Since the operation control method of vibration screen of this invention has the characteristic capable of reducing required motor capacity and power consumption in the vibration screen with two rotating shafts equipped with eccentric weights arranged in parallel and provided with a vibration generator with motors so as to drive/rotate the two rotating shafts independently, it can be suitably used for the application of vibration screen.

EXPLANATION OF SIGNS

1: vibration screen
2: bolting cloth
3: vibration generator
31*a*: rotating shaft
31*b*: rotating shaft
32*a*: eccentric weight
32*b*: eccentric weight
Ma: motor
Mb: motor
W: work

The invention claimed is:

1. An operation control method of a vibration screen including two rotating shafts with eccentric weights in parallel and a vibration generator with motors configured to drive or rotate the two rotating shafts independently, the operation control method comprising:
   presetting a threshold based on load size;
   starting conveyance of a rotating drive to each of the two rotating shafts; and
   stopping the conveyance of the rotating drive to one of the two rotating shafts after a driven or rotated state of each of the two rotating shafts becomes steady; and
   (i) if the load size is smaller than the threshold, interlocking and rotating the one of the two rotating shafts with the conveyance of the rotating drive stopped together with the other of the two rotating shafts by vibration generated by driving or rotating of the other of the two rotating shafts; or (ii) if the load size becomes larger than the threshold, starting the one of the two rotating shafts with the conveyance of the rotating drive stopped so as to drive or rotate the two rotating shafts.

2. The operation control method according to claim 1, wherein the one of the two rotating shafts is started first and then after the driven or rotated state of the one of the two rotating shafts becomes steady, the other of the two rotating shafts is started so that the drive or rotated state of the other of the two rotating shafts becomes steady.

3. The operation control method according to claim 1, wherein the other of the two rotating shafts is started first and then after the driven or rotated state of the other of the two rotating shafts becomes steady, the one of the two rotating shafts is started so that the drive or rotated state of the one of the two rotating shafts becomes steady.

4. The operation control method according to claim 1, wherein the conveyance of the rotating drive to the one of the two rotating shafts is temporarily stopped when the one of the two rotating shafts is started, thereby starting the one of the two rotating shafts through pendulum action of the one of the two rotating shafts.

5. The operation control method according to claim 1, wherein conveyance of a rotating drive to the other of the two rotating shafts is temporarily stopped when the other of the two rotating shafts is started, thereby starting the other of the two rotating shafts through pendulum action of the other of the two rotating shafts.

6. The operation control method according to claim 2, wherein the conveyance of the rotating drive to the one of the two rotating shafts is temporarily stopped when the one of the two rotating shafts is started, thereby starting the one of the two rotating shafts through pendulum action of the one of the two rotating shafts.

7. The operation control method according to claim 2, wherein conveyance of a rotating drive to the other of the two rotating shafts is temporarily stopped when the other of the two rotating shafts is started, thereby starting the other of the two rotating shafts through pendulum action of the other of the two rotating shafts.

* * * * *